Figure 3:
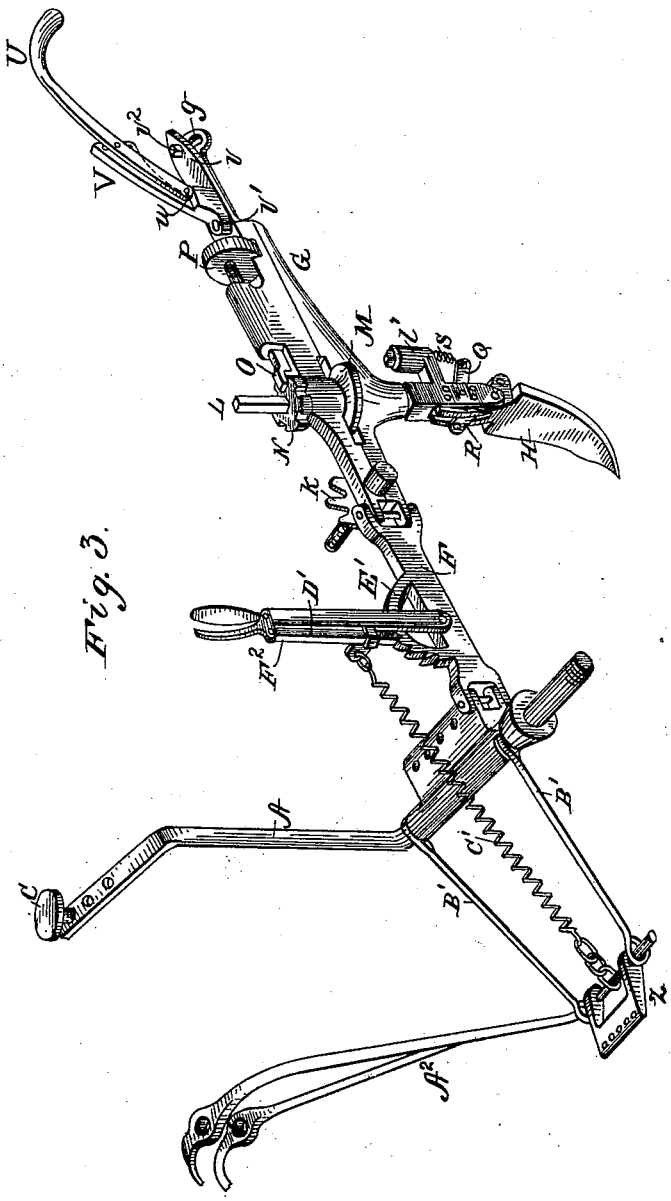

No. 689,235.    Patented Dec. 17, 1901.
W. H. SHERIDAN.
CULTIVATOR.
(Application filed Aug. 30, 1901.)
(No Model.)    3 Sheets—Sheet 1.
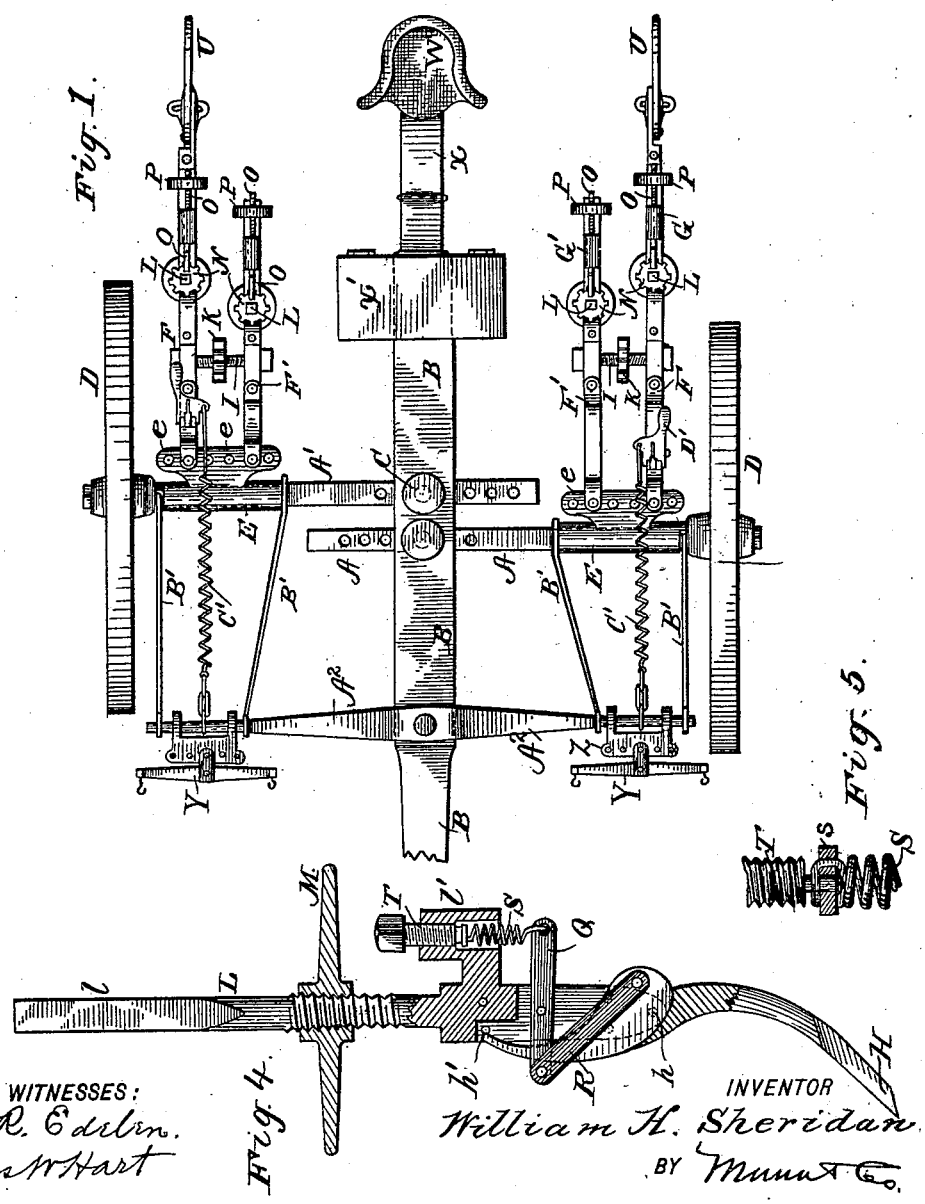
WITNESSES:    INVENTOR
    William H. Sheridan
    BY
    ATTORNEYS No. 689,235. Patented Dec. 17, 1901.
W. H. SHERIDAN.
CULTIVATOR.
(Application filed Aug. 30, 1901.)
(No Model.) 3 Sheets—Sheet 2.
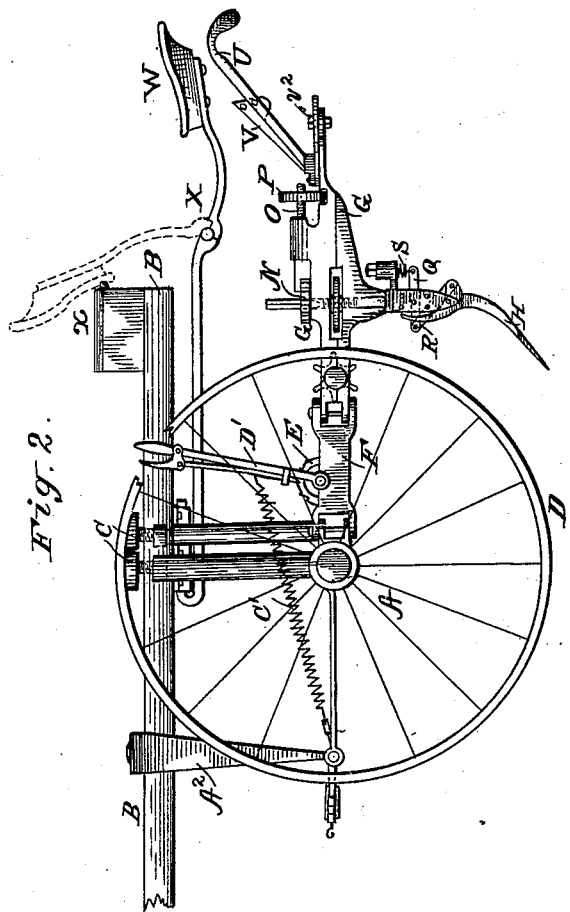
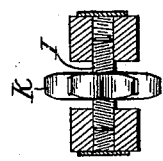
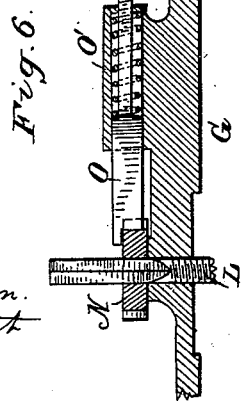
WITNESSES: INVENTOR
W. R. Edelen. William H. Sheridan,
Amos W. Hart. BY Munn & Co.
ATTORNEYS No. 689,235.

Patented Dec. 17, 1901.

W. H. SHERIDAN.
CULTIVATOR.

(Application filed Aug. 30, 1901.)

(No Model.)

3 Sheets—Sheet 3.

WITNESSES:

INVENTOR
William H. Sheridan
BY
ATTORNEYS

UNITED STATES PATENT OFFICE.

WILLIAM H. SHERIDAN, OF SADLER, TEXAS, ASSIGNOR OF ONE-HALF TO JAMES H. SMITH, OF SADLER, TEXAS.

CULTIVATOR.

SPECIFICATION forming part of Letters Patent No. 689,235, dated December 17, 1901.

Application filed August 30, 1901. Serial No. 73,829. (No model.)

*To all whom it may concern:*

Be it known that I, WILLIAM H. SHERIDAN, a citizen of the United States, residing at Sadler, in the county of Grayson and State of Texas, have made certain new and useful Improvements in Cultivators, of which the following is a specification.

My invention is an improvement in that class of cultivators which are provided with wheels and two or more cultivating implements adapted for working in adjacent parallel furrows. The cultivator is also adapted for use in digging or turning out potatoes and other similar crops. The machine is adapted for various vertical and lateral adjustments to suit the various conditions of work. The construction, arrangement, and operation of the various parts are as hereinafter described, and illustrated in the accompanying drawings, in which—

Figure 1 is a plan view of the machine. Fig. 2 is a side view of the same. Fig. 3 is a perspective view of a portion of the machine, the tongue and one of the wheels being detached. Fig. 4, Sheet 1, is an enlarged sectional view illustrating the means for supporting and adjusting a cultivating shovel or tooth and other attachments thereof. Fig. 5 is an enlarged detail of a portion of devices connected with the shovel or tooth. Fig. 6 is an enlarged detail section of the means for adjusting and locking the shovel or tooth in any required position. Fig. 7 is a detail cross-section illustrating the means for adjusting two shovel-carrying means farther from or nearer each other.

As best shown in Figs. 1 and 2, the axle of the machine is made in two sections A and A', both of which are bent upward at an obtuse angle and pass through horizontal slots in the tongue or pole B, one behind the other. The two axle-sections are provided with vertical holes or sockets, whereby they are adapted to be secured by clamp-screws C in any required adjustment. The wheels D are mounted to turn loosely on the axle-journals. Adjacent to each wheel a sleeve E is mounted loosely on the horizontal portion of each axle-section and provided with a clip e, extending parallel thereto on the rear side and having a series of holes, as shown. Two beams F and F' are pivoted to each clip e and adapted to swing laterally. To these beams F and F' are pivoted the beams G and G', which carry the shovels or teeth H. The joint between the beams F and G and F' and G' enables the beams G to be swung laterally as may be required in cultivating different crops. The beams G and G' are connected adjustably by means of a shaft I, (see Figs. 1 and 7,) which has a right and left screw-thread and works in threaded sockets in the respective beams. A star-wheel K is fixed on the center of this threaded shaft I for use in rotating the latter. It is apparent that by this construction and combination of parts the beams G and G' may be adjusted laterally and that the front ends of the beams F and F' may also be adjusted correspondingly on the clips e. In other words, the cultivating-teeth H may be placed at any required distances apart, according to the work to be done.

As shown best in Fig. 4, the shovel or tooth H is pivoted at h to the lower bifurcated end of a screw-threaded rod passing through a vertical opening in the enlarged central portion of each of the beams G and G'. A screw-nut M in the form of a disk is arranged in a horizontal slot in each of the said beams and works on the threaded portion of the rod L. It is obvious that by rotating the disk nut M the shovel or tooth H may be adjusted higher or lower as conditions require. For the purpose of locking the shaft L, so that it will not rotate with the nut M, I employ the following means: The upper portion l of the said rod is made square or in some other polygonal form, and a notched wheel or disk n (see Figs. 1 and 3) is applied thereto and provided with means for locking it. The said means consists of a pawl O, arranged slidably in a socket or guide formed on the beams G and G', and a disk nut P, which is applied to the rear screw-threaded end of said pawl. The lower edge of said nut P works in a transverse arc slot formed in the beam. It will be seen that the notched wheel N is adapted to slide vertically on the square shank of the rod L and that when engaged by the pawl O the said rod and its attached shovel H are prevented from rotating while being adjusted vertically by means of the disk nut M. It is further apparent that the pawl is adjusted to engage it with or disengage it from the notched wheel N by rotating the nut P—that is to say, while the nut P is free to rotate it is prevented from movement in line with the beams G' G', and thus the pawl works through the same and is thereby slid or adjusted longitudinally toward or from the notched wheel N. A spring O acts against the pawl to force it forward.

To adapt the shovel or tooth H to yield or trip upon meeting with an obstruction, such as a root or large stone, I employ the following means: A lever Q (see Fig. 4) is pivoted centrally and horizontally in the fork of the rod L and connected with the heel or rear extension of the shovel H by means of a link R. The rear end of said lever Q is connected by a spiral spring S with a vertically-adjustable screw-threaded bolt T, which works in an arm or bracket $l'$, forming a rear extension of the rod L. The spring S is arranged in a pocket or socket formed in the lower side of such bracket $l'$, and its upper end is connected with the screw T (see Fig. 5) by means of a disk $s$, to which the screw is pivotally attached. It is apparent from the arrangement described that by adjusting the screw T higher or lower the tension of the spring S will be changed correspondingly, and if the shovel or tooth H meets with an obstruction it will be tilted backward and the rear end of the lever Q thereby depressed, whereby the spring S will be subjected to tensile strain. By this means the tooth H is adapted to pass over obstructions of the character specified without danger of breaking any of the connected parts. If the screw T, spring S, and lever attachment Q be dispensed with, an easily breakable wooden pin may be inserted at $h'$ for engagement with the upper end of the shank of the shovel or tooth H.

Handles U are attached to the rear ends of the plow-beam G and adapted for vertical adjustment. As shown in Figs. 1 and 2, the said handles U are pivoted at $u$ to brackets V, which extend upward and rearward at an angle of about forty-five degrees and whose broadened rear ends are provided with a series of holes, through which a bolt passes for securing the handles in any required vertical adjustment. The said bracket V has a horizontal extension $v$, which is pivoted at $v'$ and provided with a bolt $v^2$, passing through an arc slot $g$ in the rear end of the beam G. By this means the handles U may be turned on the pivots $v'$, and thereby adjusted laterally at any required angle, and may be secured or clamped in such adjustment by means of the bolt $v^2$. As shown in Figs. 1 and 2, the aforesaid handles U are in such proximity to the driver's seat W that he may conveniently seize and hold them as required for any particular purpose, such as bringing the cultivating-teeth nearer to or farther from each other or for assisting in lifting the beams and their attachments when required. The said seat W is supported upon a stout spring X, whose forward end is attached to the under side of the tongue B beneath the axle. The spring is hinged at $x$, so that the seat W may be turned up forward against the end of the tongue.

The draft attachment is constructed and arranged as follows: Singletrees or doubletrees Y are attached to clevises Z and are supported rotatably upon the journals of a yoke $A^2$, which is constructed of thin metal in skeleton form and arched corresponding to the arch of the sectional axle. The yoke $A^2$ is pivoted centrally upon the tongue B, as shown. The journals or horizontal portions of the yoke are connected by rods V' with the corresponding portions of the sectional axles. It is apparent that by this construction and arrangement of parts the draft or tractive force is applied directly to the beams G and G' and their teeth H. The singletrees Y may be adjusted laterally on the clevises Z, corresponding to the beams on clips $e$.

I provide for holding the cultivator teeth or points H and their beams G and G' raised, so as to be out of action, by means of a spring C', lever D', and segment-ratchet E'. (See especially Fig. 3.) The said segment is formed on or attached to the upper side of each of the beams F, and the levers D' are pivoted to the latter concentrically with the segments and provided with a locking-pawl $F^2$, arranged in a well-known manner. The said spring is connected with the ends of the yoke $A^2$ and with a lug projecting from the lever D'. The spring is arranged at an acute angle to the rods V and V', which connect the yoke $A^2$ with the axle-sections A and A'. It will be seen that by adjusting the lever D' the tension of the spring may be increased, so that when the plow-beams are arranged they may be locked and held supported at an angle to the ground, so that the shovels or teeth H will be above the surface of the same. When the parts are so adjusted and held, the machine is adapted for transportation.

This cultivator is adapted for plowing or cultivating cotton, corn, potatoes, and various other kinds of crops which are sown in rows, and it is particularly adapted for this purpose by reason of the fact that the teeth or shovels H may be adjusted at any lateral or horizontal angle and may also be adjusted vertically, so as to work to any required depth. I propose to use any kind or any size of cultivating shovel or tooth, according to the work to be done.

By moving—that is, adjusting—the sectional axles A and A' inward or outward with reference to the tongue B the gangs of cultivating implements may be adjusted nearer to or farther from each other, according to the distances between the rows of the crop being cultivated. For example, adjustment may be made to adapt the machine for turning out potatoes, and for this purpose the shovels or teeth of each pair would be turned outward at a slight angle. The grass in cotton and corn or in vegetables growing in rows can be turned from the row into the furrow by the inside teeth H and covered over with soil by means of the outside and rear teeth. The cultivator is adapted to take the place of a turning-plow in plowing any small grain, such as oats, wheat, barley, rye, &c.

While the seat W is shown arranged so the driver can easily hold the handles U, and thus keep the plows in any desired position, he may also do this while walking behind the machine.

A tool-box X' is mounted and secured upon the rear end of the tongue B.

What I claim is—

1. In a cultivator of the class described, the combination, with a tongue and axle, of two beams, carrying cultivating devices, and arranged side by side, and pivoted to the axle, a screw-shaft having a right and left thread, the same working in threaded bores formed in the said beams, and a star-wheel fixed on the central portion of said shaft, substantially as shown and described.

2. In a cultivator of the class described, the combination, with the tongue, the axle, and a beam connected with the latter, of a screw-threaded shaft carrying a cultivating device, the same being arranged and adapted to work vertically in the said beam, a disk nut applied to the shaft and arranged in a horizontal slot in said beam, and projecting laterally beyond the side of the latter, whereby it is adapted to be rotated manually for adjusting the cultivating device higher or lower, substantially as shown and described.

3. In a cultivator of the class described, the combination, with the tongue, axle, and beam attached to the latter, of a screw-shaft having a polygonal upper portion and carrying a cultivating device, a nut applied to the threaded portion of said shaft, and arranged in a slot in the beam, a notched wheel or disk adapted to slide vertically on the polygonal portion of the shaft, and means for locking said wheel to prevent rotation of the shaft, substantially as shown and described.

4. In a cultivator of the class described, the combination, with a tongue, axle, and a beam attached to the latter, of a screw-threaded shaft carrying a cultivating device, a nut applied to said shaft for adjusting it higher or lower, a notched wheel applied to the polygonal upper portion of the shaft, a pawl or locking device adapted to engage said wheel and arranged slidably in a suitable guide, and a disk nut applied to the threaded outer end of said pawl and engaging a notch or guideway in the beam, whereby it is permitted to rotate without moving toward or from the said notched wheel, substantially as shown and described.

5. In a cultivator of the class described, the combination, with the tongue, axle, and beam attached to the latter, of a screw-threaded shaft having a polygonal portion and carrying a cultivating device, said shaft being arranged in a vertical bore in the beam, a disk nut applied to the threaded portion and projecting laterally from the sides of the beam, the notched wheel arranged on the polygonal portion of the shaft and adapted to slide vertically thereon, a pawl arranged slidably in a guideway on the said beam, a spring acting thereon for forcing the pawl forward, and a disk nut applied to the threaded rear end of the pawl and working in a transverse notch or guideway in the beam, substantially as shown and described.

6. In a cultivator of the class described, the combination, with the tongue, axle, a sleeve mounted rotatably on the latter, and a beam attached to the sleeve and provided with a notched segment, of a spring extending forward, and attached to a fixed portion of the machine, a lever pivoted to the beam concentrically with the said segment and connected with the spring, and a locking device attached to said lever, and adapted to engage the segment, whereby the beam may be held raised at any required height, substantially as shown and described.

7. In a cultivator of the class described, the combination, with the tongue and downward-bent axle, a yoke secured to the tongue in advance of the axle and having a similar downward bend, and means for connecting said yoke rigidly with the axle, of a beam carrying a cultivating device and having a tongue-segment as described, a spiral tension-spring connected with the said yoke, and a locking-lever which is pivoted to the beam and suitably engaged with the segment, substantially as shown and described.

WILLIAM H. SHERIDAN.

Witnesses:
JON. D. MOSS,
JAMES T. HACKLEMAN.